United States Patent
He

(10) Patent No.: US 6,550,363 B2
(45) Date of Patent: Apr. 22, 2003

(54) EXTENDIBLE COMPOUND MITER SAW

(76) Inventor: Cai Bai He, 1050 NE. 169[th]Ter., N. Miami Beach, FL (US) 33162

( * ) Notice: Subject to any disclaimer, the term of this patent is extended or adjusted under 35 U.S.C. 154(b) by 12 days.

(21) Appl. No.: 09/832,061

(22) Filed: Apr. 10, 2001

(65) Prior Publication Data

US 2002/0144582 A1 Oct. 10, 2002

(51) Int. Cl.[7] .................. B23D 45/14; B23D 47/08; B27B 5/18; B26D 7/26
(52) U.S. Cl. .................. 83/471.3; 83/473; 83/477; 83/477.2; 83/489; 83/581
(58) Field of Search .................. 83/471.2, 471.3, 83/472, 473, 477, 477.1, 477.2, 483, 484, 485, 486, 487, 489, 581, 635, 829, 698.51, 698.61, 699.51, 699.61, 928

(56) References Cited

U.S. PATENT DOCUMENTS

| | | | | |
|---|---|---|---|---|
| 473,429 A | * | 4/1892 | Phillips | 83/471.3 |
| 2,719,550 A | * | 10/1955 | Groves | 83/486 |
| 3,331,406 A | * | 7/1967 | Christophel | 83/471.3 |
| 3,910,142 A | * | 10/1975 | Jureit et al. | 83/485 X |
| 4,587,875 A | * | 5/1986 | Deley | 83/471.3 |
| 4,590,831 A | * | 5/1986 | Brodin | 83/471.3 X |
| 4,701,063 A | * | 10/1987 | Wysk et al. | 83/483 X |
| 4,750,255 A | * | 6/1988 | Hufnagel | 83/487 X |
| 4,869,142 A | * | 9/1989 | Sato et al. | 83/471.3 X |
| 4,958,544 A | * | 9/1990 | Miyamoto | 83/471.3 |
| 5,239,906 A | * | 8/1993 | Garuglieri | 83/471.3 |
| 5,241,888 A | * | 9/1993 | Chen | 83/471.3 |
| 5,287,780 A | * | 2/1994 | Meztger et al. | 83/471.3 X |
| 5,421,228 A | * | 6/1995 | Fukinuki | 83/471.3 |
| 5,524,516 A | * | 6/1996 | Sasaki et al. | 83/471.3 |
| 5,526,856 A | * | 6/1996 | Pedri | 83/471.3 X |
| 5,768,967 A | * | 6/1998 | Sasaki et al. | 83/471.3 |
| 5,839,339 A | * | 11/1998 | Sasaki et al. | 83/471.3 |
| 5,870,939 A | * | 2/1999 | Matsubara | 83/471.3 |
| 5,907,987 A | * | 6/1999 | Stumpf et al. | 83/471.3 |
| 6,029,721 A | * | 2/2000 | O'Banion | 83/471.3 X |
| 6,170,373 B1 | * | 1/2001 | Saski et al. | 83/485 |
| 6,370,996 B1 | * | 4/2002 | Tedrick | 83/485 |

* cited by examiner

*Primary Examiner*—Charles Goodman
(74) *Attorney, Agent, or Firm*—Gold & Rizvi, P.A.; Glenn A. Gold; H. John Rizvi

(57) ABSTRACT

An extendible miter saw is provided having a base (10), an angularly rotatable member (86) attached to a rear end of the base, a saw assembly (40) pivotally mounted to a support block (50), a pair of telescoping arms (70, 72) attached at opposite ends to the rotatable member and the support block, and a wheeled support assembly attached to the support block and movable along an upper surfaces of the base and extension members (26, 28, 30) extending outwardly from the base.

3 Claims, 4 Drawing Sheets

US 6,550,363 B2

EXTENDIBLE COMPOUND MITER SAW

FIELD OF THE INVENTION

The present invention relates generally to desk-top circular saws, and more particularly to an improved miter saw assembly having an extendible working surface for supporting a longer workpiece, wherein the sawing unit is vertically supported by a wheeled support assembly and a pair of telescoping arms enabling smooth longitudinal extension and retraction of the sawing unit during operation.

BACKGROUND OF THE INVENTION

Motor-driven desk top circular saws, commonly referred to as compound miter saws, are well known cutting devices often used to perform both miter and bevel cuts. A disadvantage of such devices is that their maximum cutting length is limited by the diameter of the saw blade. This limitation requires the operator to reposition the workpiece in order to complete a cut longer than the diameter of the saw blade.

To overcome this disadvantage, compound miter saws have been provided with slide mechanisms so that the saw blade can be moved laterally of the workpiece to enable longer cuts to be made without repositioning the workpiece. Compound miter saws incorporating slide mechanisms for enabling longer cuts are disclosed in U.S. Pat. Nos. 4,869,142; 5,870,939; 5,768,967; 5,241,888 and 5,524,516. However, the disclosed slide mechanisms share a number of drawbacks and limitations.

A significant limitation of the aforementioned slide mechanisms is their restricted range of movement. For instance, U.S. Pat. No. 5,768,967 to Sasaki et al. and U.S. Pat. No. 5,870,939 to Matsubara disclose circular saw units slidably supported on a table by a slide mechanism including one or more slide bars extending into the table. In each case, the length of the slide bars defining the range of movement of the saw is limited by the size of the table into which the slide bars are received. U.S. Pat. No. 4,869,142 to Sato et al., U.S. Pat. No. 5,241,888 to Chen and U.S. Pat. No. 5,524,516 to Sasaki et al., each disclose a circular saw unit supported at a distal end of a slide bar mechanism. In each instance, the slide bar mechanism is extendible through a support whose position is fixed with respect to the table. As the slide bar mechanism is advanced, the weight of the circular saw unit causes a corresponding increasing bending moment about the support due to the cantilever type design. Consequently, the length of the slide bar mechanisms are necessarily limited to prevent undesirable bending of the slide bars, and corresponding downward movement of the saw unit, during a cutting operation.

Furthermore, the aforementioned patents disclose sliding mechanisms in which the sliding bars frictionally engage supporting structure as the saw unit is being slidably extended, making it difficult to maintain smooth, continuous movement of the saw unit while making a workpiece cut. In addition, the aforementioned slide mechanisms incorporate sliding bars having outer surfaces which remain exposed to the work environment during use. Consequently, dirt and other debris, including saw dust, may tend to adhere to the sliding bars and further impede the desired smooth and continuous sliding motion.

Accordingly, it would be desirable to provide a desk top circular saw incorporating a sliding mechanism overcoming these and other disadvantages and limitations of the prior art.

SUMMARY OF THE INVENTION

It is an object of the present invention to provide a table-top circular saw apparatus having telescoping arms enabling the saw unit to be extended and retracted to provide increased maximum workpiece cut lengths vis-a-vis known slidable circular saws.

It is another object of the present invention to provide a table-top circular saw apparatus including a rotatable workpiece support table having a cutting surface extendible in the saw cutting direction to accommodate the increased saw extension enabled by the telescoping arms.

It is yet another object of the present invention to provide a table-top circular saw incorporating a wheeled subassembly supporting the weight of the saw unit, thereby preventing bending of the telescoping arm members during extension thereof.

It is a further object of the present invention to provide an extendible saw apparatus having a wheeled subassembly including an internal level detection device restricting the downward extension of the assembly where the saw unit in an angularly rotated orientation with respect to the cutting surface.

It is still a further object of the present invention to provide a table-top circular saw apparatus incorporating a lock and key arrangement designed to prevent angular rotation of the saw unit unless the telescoping arms are in a fully retracted state.

These and other objects are achieved with the table top cutting apparatus of the present invention. Generally, an extendible compound miter saw assembly is provided comprising a base having a surface for supporting a workpiece to be cut, an angularly rotatable member extending from a rear end of the base, a saw unit subassembly mounted to a support block and vertically pivotal with respect thereto, a pair of telescoping arms attached at a near end to the angularly rotatable member and attached at a distal end to the support block, and a wheeled subassembly attached to the support block for supporting the weight of the saw unit subassembly and for enabling the saw unit to be extended and retracted during a cutting operation.

In an aspect of the invention, a retractable table extension subassembly is provide having means for being removably attached to a projecting portion of the base for supporting a long workpiece requiring an extended cut. Retractable table support legs are provided depending from the bottoms of the individual table extension members.

In another aspect of the invention, a latch mechanism is provided along with a key & lock subassembly for preventing extension of the saw unit when the angularly rotatable member is rotated with respect to the base.

In another aspect of the invention, a wheeled subassembly is provided having internal level detecting means restricting the subassembly from being lowered toward the workpiece support surface unless the wheeled subassembly is oriented substantially perpendicular to the underlying workpiece support surface.

DETAILED DESCRIPTION OF THE PREFERRED EMBODIMENT

Figure 1:
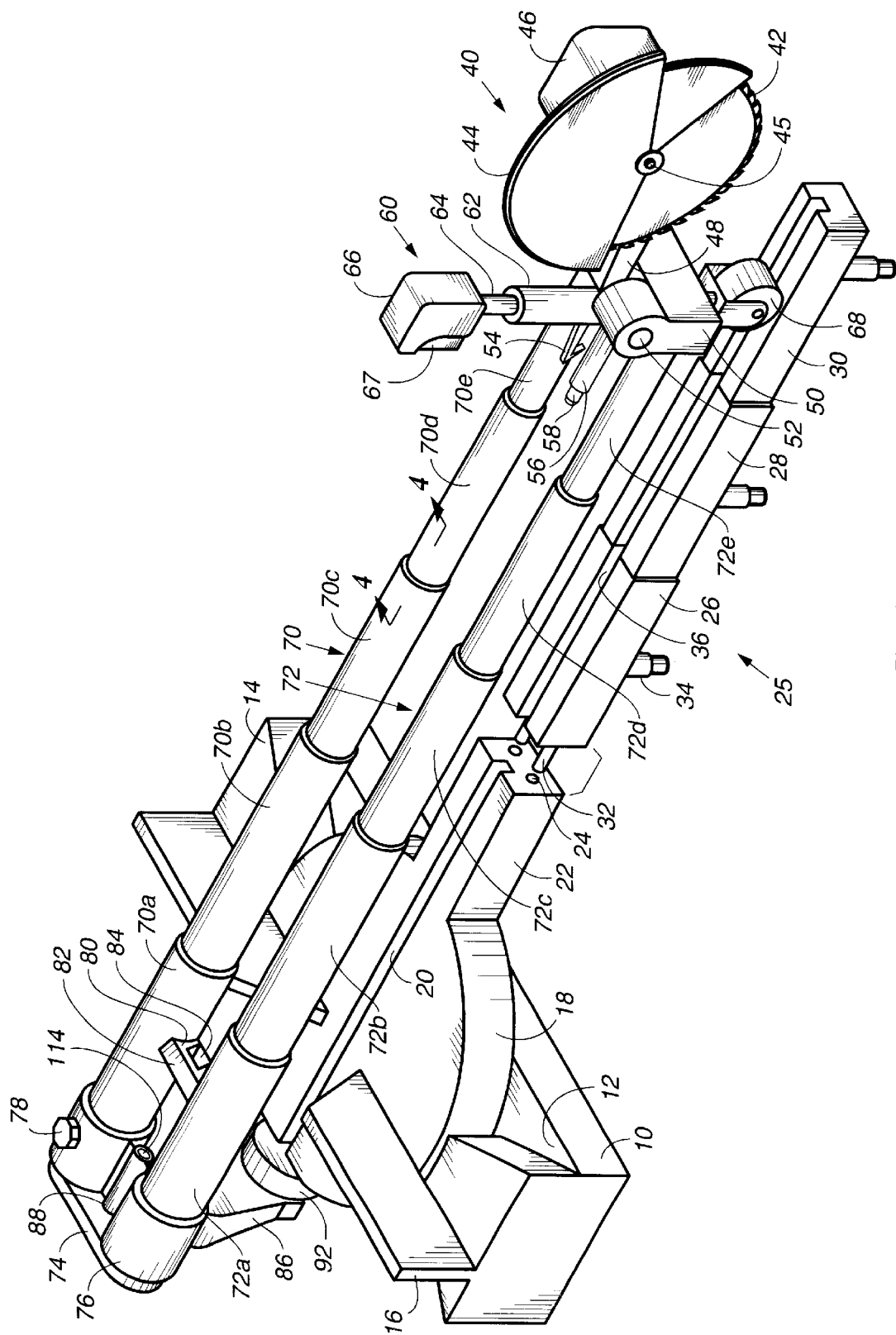
FIG. 1 is a prospective view of slidable table top circular saw apparatus, in a fully extended position, in accordance with a preferred embodiment of the present invention.

Referring now to FIG. 1, there is shown the overall construction of an extendible-type circular saw in accordance with a preferred embodiment of the present invention. A base 10 has an upper surface 12 upon which a turntable 18 is mounted. The turntable 18 is rotatable within a horizontal plane about a support portion (not shown) of the base 10 by a predetermined angular range. The turntable 18 is further captivated horizontally by turntable support members 14 engaging its sides. A workpiece support fence 16 fixed to the upper surface of the turntable support members 14 restricts workpiece movement during cutting operations.

Rotatable turntable 18 has a projecting portion 22 extending outwardly from the turntable in the cutting direction. Saw blade channel 20 extends longitudinally across the turntable surface in the direction of cutting. A pair of apertures 24 provided running longitudinally through turntable projection 22 are sized and shaped for snugly receiving respective rod members 32 projecting from turntable extension subassembly 25. Turntable extension subassembly 25, described in more detail below, is employed during cutting operations requiring additional table support area for longer work pieces. In other words, turntable extension subassembly 25 is employed to support work pieces requiring a cut length greater than the maximum cutting length possible using rotatable turntable 18.

Turntable extension subassembly 25 has a retractable structure comprising a plurality of individual extension members 26, 28, 30 arranged to be collapsed within one another during storage, or fully extended (as illustrated in the accompanying figures) during use. Such collapsible workpiece support structures are known in the art and are not described herein. When fully extended, the upper surfaces of the individual extension members 26, 28, 30 share a common plane with one another and with the upper surface of rotatable turntable 18, thereby forming a contiguous level workpiece support surface. The individual extension members have integral cutting channels 36 substantially aligned with each other and with rotatable turntable cutting channel 20. Although the accompanying drawing figures depict a turntable extension subassembly 25 having three individual extension members 26, 28, 30, it will be apparent to those skilled in the art that the number of extension members can be varied. Preferably, the maximum combined length of the extension members enable continuous cut lengths of at least about 2.5 meters.

Vertically adjustable support legs 34 depend from the lower surfaces of the extension members for supporting, and preventing bending of, the extension subassembly 25 during cutting operations. Preferably, the legs 34 are provided as detachable components having an upper end adapted for being removably attached to the underside of the extension members, and a lower end adapted for frictionally engaging the underlying apparatus supporting surface.

The circular saw unit 40 has a conventional miter saw construction which will now be described in brief. The saw unit 40 includes a circular saw blade 42 and saw blade housing 44 mounted on a saw shaft 45, and an electric motor 46 for rotatably driving the circular saw. The circular saw subassembly 40 is supported by a T-shaped support arm 48 including a shaft portion 52 pivotally received within support block 50 such that the entire saw unit 40 can be vertically pivoted about the shaft 52. A conventional locking structure (not shown) is provided to maintain the saw subassembly in the desired raised or lowered position.

Figure 2:
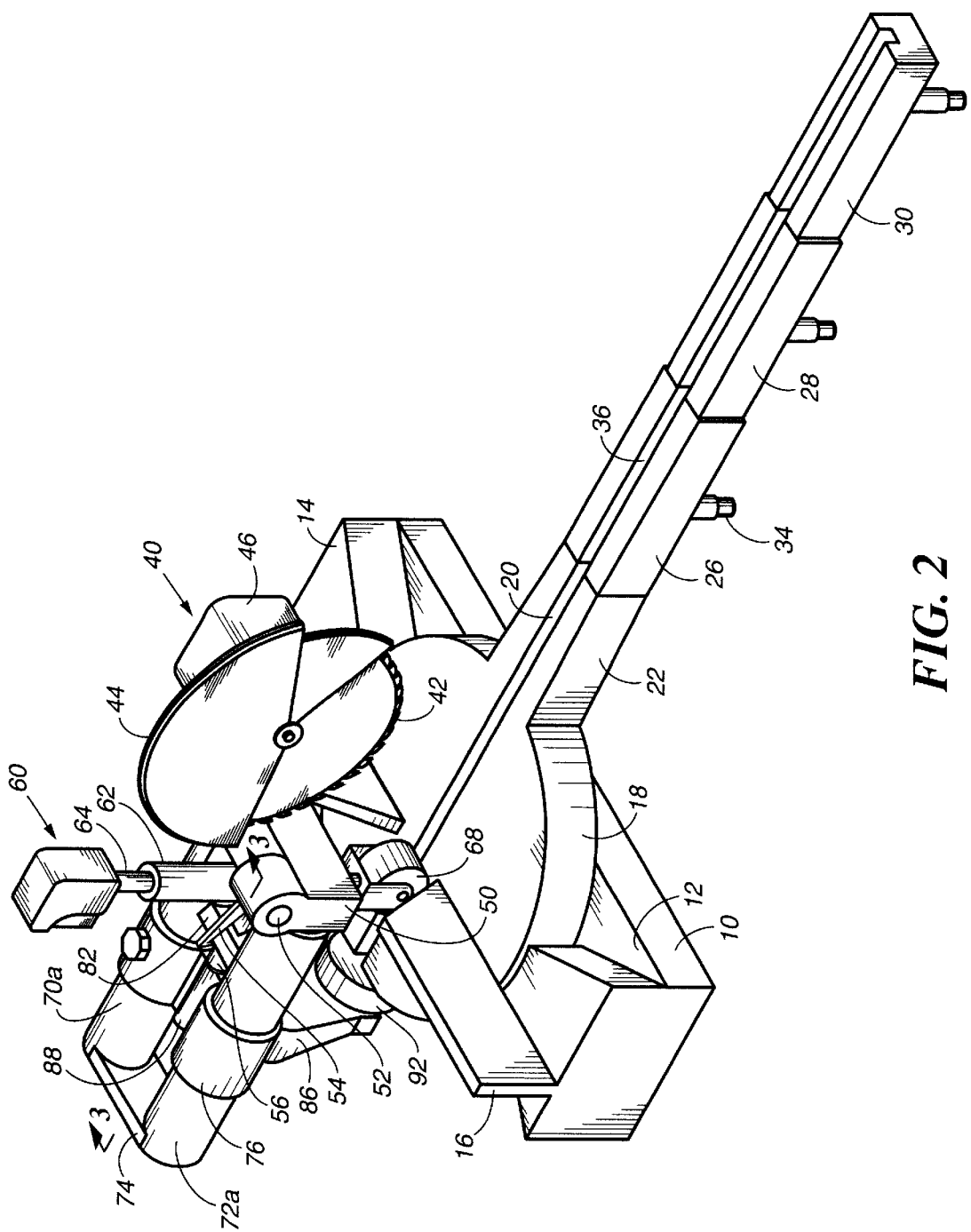
FIG. 2 is a perspective view of the slidable table top circular saw of depicted in FIG. 1, in a fully retracted position.

A wheeled subassembly 60 is provided for supporting the weight of support block 50 and circular saw unit 40 during extension and retraction thereof. The wheeled subassembly 60 is fixedly attached to the inner facing surface of support block 50 via outer shaft member 62 using any conventional attachment means, including mechanical fasteners and the like. An inner shaft member 64 is provided having a handle portion 66 attached at its upper end. The handle includes an actuating mechanism 67 for triggering internal components (not shown) of the subassembly 60 in order to raise the wheel 68. The actuating mechanism 67 is only useful for raising wheel 68 when saw unit 40 is in a completely retracted position, as illustrated in FIG. 2. More specifically, a latch member 54 extending through an aperture (not shown) in outer shaft member 62 cooperates with one or more of the internal components of subassembly 60 in such a manner as to prevent upward motion of the wheel 68 when the latch member 54 is in a lowered position, as illustrated in FIG. 1.

As further described below, when the saw unit is fully retracted the latch member 54 engages an upper surface 82 of bridge member 80 in a manner which biases the latch member upwardly to enable the function of actuating mechanism 67 for raising the wheel 68. Preferably, the rolling direction of the wheel 68 is restricted to the cutting direction. Although the wheel is illustrated contacting the workpiece support surface in the accompanying drawing figures, the wheel actually rides along the upper surface of the workpiece being cut. In other words, a typical cutting operation of a long workpiece generally comprises the steps of: (1) ensuring that the saw unit is not angularly rotated; (2) lowering the wheeled assembly 60; (3) outwardly extending the wheeled assembly 60; (4) providing a planar work piece (not shown) to be cut on the workpiece supporting surfaces; (5) lowering the saw blade; and (6) retracting the operating saw unit toward the base 10 to effect the desired cut through the workpiece.

Preferably, level detection means (not shown) are provided internal to wheel assembly shaft 62 to prevent the assembly from being lowered unless the shaft 62 is substantially perpendicular to the workpiece supporting surface. Consequently, the level detection means prevent the wheel 68 from being lowered when circular saw blade 42 is not disposed substantially perpendicular to the workpiece supporting surfaces and aligned with the respective saw blade channels 20, 36. Therefore, when the saw is in an angularly rotated orientation, the level detection means prevents handle 66 from being pushed down, thereby preventing the release of latch member 54 from bridge surface 82. Consequently, the telescoping arms 70, 72 cannot be extended while the saw unit is angularly rotated. It will be apparent to those skilled in the art that myriad different leveling devices or mechanisms could be incorporated into the shaft 62 to accomplish the desired functionality. While the saw unit assembly 40 is in the fully retracted position, the saw unit can be used as a typical miter saw for making either straight or beveled cuts. However, the cut lengths are limited as with conventional miter saws.

A pair of telescoping arm subassemblies 70, 72 are provided for enabling the circular saw unit 40 to be smoothly extended and retracted along substantially the entire length of the workpiece support surface. Each telescoping arm is comprised of a plurality of individual telescoping arm segments. For example, arm 70 is actually comprised of individual arm segments 70a–70e, and arm 72 is comprised of individual arm segments 72a–72e. Although the accompanying drawing figures illustrate five such arm segments per each telescoping arm, it will be apparent to those skilled in the art that the invention is not intended to be so limited. The number of arm segments can be increased or decreased without departing from the scope of the invention. The telescoping arms 70, 72 are attached at their near ends by end plate 74, with the largest diameter arm segments 70a, 72a slidably supported through guide collars 76 of support member 86 with one of the guide collars having a set screw 78. The telescoping arms 70, 72 are attached at their distal ends, i.e., of segments 70e and 72e, to support block 50.

Figure 4:
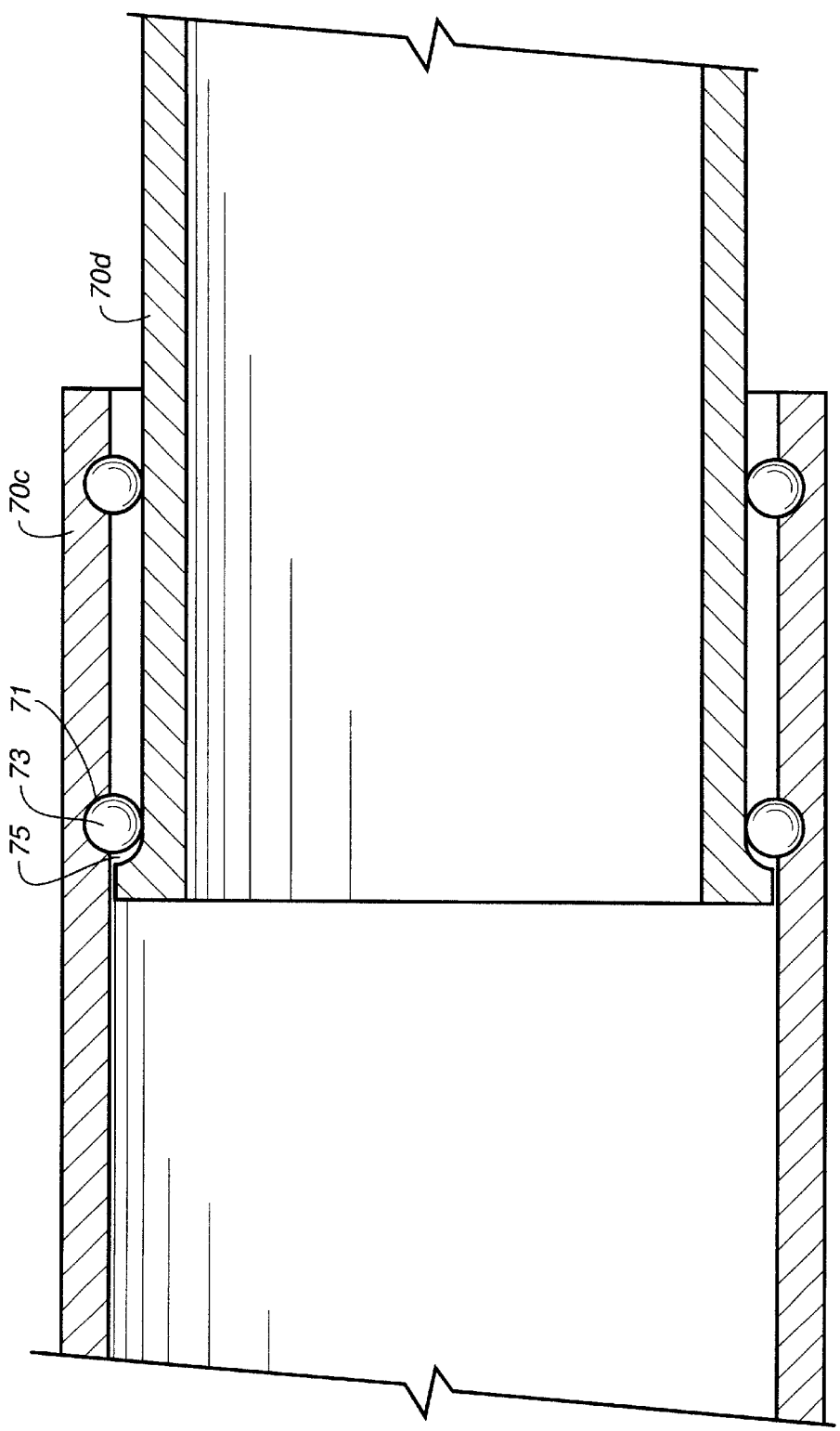
FIG. 4 is a cross-sectional view along line 4—4 of FIG. 1, further illustrating the structure of the telescoping arms.

Referring briefly to FIG. 4, spherical bearings 73 provided between the inner and outer surfaces of adjacent arm segments, such as 70c and 70d in FIG. 4, ensure smooth retraction and extension of arms 70 and 72 during a cutting operation. Spherical bearings 73 are rotatably disposed between depressions 71 in the inner surface of outer arm segment 70c and the outer surface of inner arm segment 70d. Each pair of adjacent arm segments cooperate in a manner which prevents disengagement from one another during extension. For example, referring specifically to FIG. 4, extension of inner arm segment 70d is restricted by the engagement between spherical bearing 73 and curved lip 75 of outer arm segment 70c.

Figure 3:
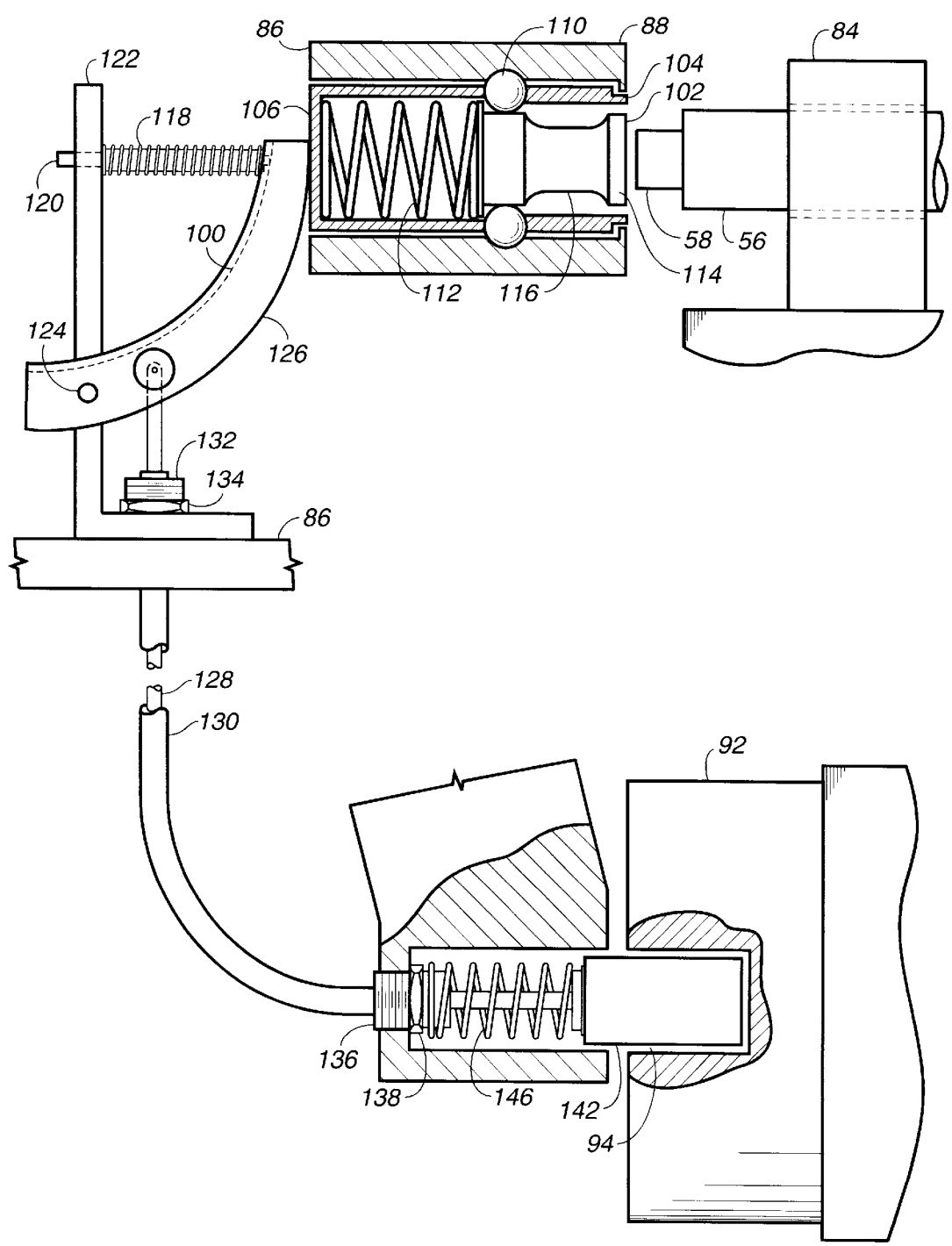
FIG. 3 is a partially-fragmented cross-sectional view along line 3—3 of FIG. 2, illustrating the arrangement and mechanical relationship of the components which interact to effect angular rotation of the saw unit in the fully retracted position.

As will now be described in more detail with reference particularly to FIG. 3, as circular saw unit 40 is retracted latch member 54 and key member 56 each cooperate with various structures and components of the apparatus to enable the saw unit 40 to be angularly pivoted.

As the saw unit 40 is retracted, an angled tip portion of downwardly biased latch member 54 engages tapered surface 82 of bridge member 80, forcing the latch member upwards until the angled tip portion extends over and catches the edge of the bridge member. In this retracted position, the angled tip engages the bridge member 80 to prevent outward extension of the saw unit 40.

Simultaneously, key member 56 extends through aperture 84 in bridge member 80. In FIG. 3, the tip 58 of key member 56 is illustrated extending just short of channel opening 102 in the key member receiving portion of support member 88. This is for illustrative purposes only; in operation, it is preferred that the key member tip 58 is actually received in channel 102 and engages plug member 114. More specifically, as key tip 58 is inserted through channel opening 102 it engages aperture plug member 114, forcing it against compression spring 112. As plug member 114 is urged against compression spring 112, spherical members 110 fall into plug depressions 116, thereby enabling slidable member 104 to be urged rearwardly. As member 104 is displaced, rear surface 106 contacts pivot arm 126, urging its counter-clockwise rotation about pivot point 124.

The pivot arm 126 is biased towards the rear surface 106 by a compression spring 118 disposed between the support bracket 122 and a portion of the pivot arm. The pivot arm has a groove or a channel 100 that allows the pivot arm to be guided by the rod 120 as the arm pivots. As pivot arm 126 pivots about pivot point 124, cable 128 is pulled upwards through cable sheath 130. Cable sheath 130 is fixed at this upper end to support housing 86 by bolt 132 and nut 134. At its lower end, cable sheath 130 is fixed to support housing 86 by bolt 136 and nut 138. The lower end of cable 128 is attached to retractable pin 142. In its equilibrium state, pin 142 is outwardly biased by compression spring 146 forcing its frictional engagement with cavity 94 in rotation plate 92. In this equilibrium engaged position, rotation of support member 86 about rotation plate 92 is precluded. However, as cable 128 is pulled up by pivot arm 126, retractable pin 142 is disengaged from aperture 94, enabling rotation of support member 86 and corresponding attached saw unit 40. As previously described, in this state, wheel 68 of subassembly 60 can be raised and the saw can be operated as a conventional miter saw.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

I claim:

1. An extendible compound miter saw assembly, comprising:

a base having a surface for supporting a workpiece to be cut, the surface having a saw blade receiving channel provided therein;

an angularly rotatable member extending from a rear end of said base;

a saw subassembly pivotally mounted to a support block;

a pair of telescoping arms attached at a near end to said angularly rotatable member and attached at a distal end to said support block;

a vertically adjustable wheeled subassembly attached to said support block for supporting the weight of said saw subassembly and enabling said saw assembly to be extended and retracted during a cutting operation; and a table extension subassembly disposed adjacent to said base comprising a plurality of telescoping table members each having a saw blade receiving channel provided therein, the saw blade receiving channels of said telescoping table members aligning with one another and with the saw blade receiving channel provided in said base when said table extension subassembly is in a fully extended position.

2. An extendible compound miter saw assembly as recited in claim 1, wherein said a table extension subassembly has an end adapted for being releasable attached to said base.

3. An extendible compound miter saw assembly as recited in claim 2, wherein said wheeled subassembly further comprises a wheel member adapted for being rolled along an upper surface of the workpiece during the cutting operation.

* * * * *